(12) United States Patent
Chandrashekar

(10) Patent No.: US 10,972,347 B2
(45) Date of Patent: Apr. 6, 2021

(54) CONVERTING A FIRST CLOUD NETWORK TO SECOND CLOUD NETWORK IN A MULTI-CLOUD ENVIRONMENT

(71) Applicant: Hewlett Packard Enterprise Development LP, Houston, TX (US)

(72) Inventor: Charan Acharya Chandrashekar, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 16/249,101

(22) Filed: Jan. 16, 2019

(65) Prior Publication Data
US 2020/0228397 A1 Jul. 16, 2020

(51) Int. Cl.
G06F 15/177 (2006.01)
H04L 12/24 (2006.01)
H04L 29/08 (2006.01)

(52) U.S. Cl.
CPC ............ H04L 41/082 (2013.01); H04L 67/10 (2013.01); H04L 67/32 (2013.01)

(58) Field of Classification Search
CPC ........ H04L 41/082; H04L 67/10; H04L 67/32
USPC ...................................................... 709/221
See application file for complete search history.

(56) References Cited

U.S. PATENT DOCUMENTS

| | | | |
|---|---|---|---|
| 6,260,068 B1 | 7/2001 | Zalewski et al. | |
| 9,075,811 B2 | 7/2015 | Nayyar et al. | |
| 9,104,460 B2 | 8/2015 | Jansen | |
| 9,430,213 B2 | 8/2016 | Fu et al. | |
| 9,430,268 B2 | 8/2016 | Hussain et al. | |
| 9,444,896 B2 | 9/2016 | Zheng et al. | |
| 9,692,632 B2 | 6/2017 | Bhattacharya et al. | |
| 2009/0063751 A1 | 3/2009 | Dow | |
| 2010/0169253 A1 | 7/2010 | Tan | |

(Continued)

OTHER PUBLICATIONS

HP-UX Cloud, "HPE Helion OpenStack for HPE Integrity / HP-UX servers", available online at <https://web.archive.org/web/20170831232913/https://h20392.www2.hpe.com/portal/swdepot/displayProductInfo.do?productNumber=Z7550-02095>, Aug. 31, 2018, 2 pages.

(Continued)

*Primary Examiner* — Alan S Chou
(74) *Attorney, Agent, or Firm* — Hewlett Packard Enterprise Patent Department

(57) ABSTRACT

The disclosure describes techniques for converting a source cloud network to a destination cloud network. In one implementation, a method includes: receiving a user request to convert a source cloud network to a destination cloud network; in response to receiving the request, invoking a driver based on the destination cloud network specified in the user request; using at least the invoked driver to retrieve cloud configuration data of the source cloud network and an operating system (OS) image of the destination cloud network; using at least the retrieved cloud configuration data of the source cloud network and the retrieved OS image of the destination cloud network, converting the source cloud network to the destination cloud network, wherein converting comprises: registering a controller and compute node of the source cloud network as a controller and compute node of the destination cloud network; and sending a notification that the conversion was completed.

20 Claims, 9 Drawing Sheets

(56) References Cited

U.S. PATENT DOCUMENTS

| | | | |
|---|---|---|---|
| 2012/0005359 | A1 | 1/2012 | Seago et al. |
| 2012/0265959 | A1* | 10/2012 | Le .................. G06F 16/166 711/162 |
| 2013/0219161 | A1* | 8/2013 | Fontignie .................. G06F 8/63 713/2 |
| 2014/0025821 | A1 | 1/2014 | Baphna et al. |
| 2014/0181301 | A1 | 6/2014 | Yendluri |
| 2014/0189677 | A1 | 7/2014 | Curzi et al. |
| 2015/0052521 | A1 | 2/2015 | Raghu |
| 2015/0263894 | A1 | 9/2015 | Kasturi et al. |
| 2015/0317177 | A1 | 11/2015 | Hussain et al. |
| 2015/0334019 | A1* | 11/2015 | Saito .................. H04L 45/745 709/238 |
| 2015/0378783 | A1 | 12/2015 | Tarasuk-Levin et al. |
| 2016/0088068 | A1 | 3/2016 | Toy |
| 2016/0253194 | A1 | 9/2016 | Kolesnik et al. |
| 2017/0017512 | A1* | 1/2017 | Csatari .................. G06F 9/45558 |
| 2017/0371696 | A1 | 12/2017 | Prziborowski et al. |
| 2019/0124018 | A1 | 4/2019 | Zhang |
| 2019/0163522 | A1* | 5/2019 | Tasoulas .................. G06F 9/4856 |

OTHER PUBLICATIONS

HPE Onesphere, "A new cloud management platform ready to power every idea", available online at <https://web.archive.org/web/20180917070617/https://www.hpe.com/in/en/solutions/cloud/hybrid-it-management.html>, Sep. 17, 2018, 12 pages.

HPE, "Delete a Cloud Account from a RightScale Account", May 3, 2017, available online at <https://web.archive.org/web/20170503025257/https://docs.rightscale.com/cm/dashboard/settings/account/delete_a_cloud_account_from_a_rightscale_account.html>, 3 pages.

HPE, "HPE Greenlake Hybrid Cloud", retrieved in 2019, available online at <https://www.hpe.com/in/en/solutions/cloud/onesphere.html>, 10 pages.

HPE, "Oneshpere", Feb. 2019, 34 pages.

HPE, "Two Ways to Do Cloud Better with RightScale", Jan. 15, 2019, available online at <https://web.archive.org/web/20190115031704/https://www.rightscale.com/>, 11 pages.

Unpublished U.S. Appl. No. 16/118,205, by Charan Acharya Chandrashekar, entitled "Cloud Migration", filed Aug. 30, 2019.

BMC Software; "Multi-cloud Management"; printed on Jul. 4, 2018 from: http://www.bmcsoftware.in/it-solutions/multi-cloud-management.html; 14 pages.

Alan Murphy, "Enabling Long Distance Live Migration with F5 and VMware vMotion", Enabling Long Distance Live Migration with F5 and VMware vMotion, 2011, pp. 1-10.

Cisco, "Cisco HyperFlex Multicloud Platform", Solution brief Cisco public, 2018, 4 pages.

Cisco-VMware, "Virtual Machine Mobility with Vmware VMotion and Cisco Data Center Interconnect Technologies", 2009, pp. 1-17.

CloudEndure, "CloudEndure _ Disaster Recovery, Cloud Backup, and Cloud Migration", available online at <https://web.archive.org/web/20181228002515/https:/www.cloudendure.com/>, 2018, 7 pages.

CloudEndure, "How CloudEndure Disaster Recovery Works", Technical White Paper, 2018, pp. 1-6.

Extended European Search Report received for EP Patent Application No. 19192295.4, dated Jan. 16, 2020, 09 pages.

Hewlett Packard Enterprise, "A New Cloud Management Platform Ready to Power Every Idea", available online at <https://web.archive.org/web/20180917070617/https://www.hpe.com/in/en/solutions/cloud/hybrid-it-management.html>, Retrieved on Sep. 17, 2018, 12 pages.

Hewlett Packard Enterprise, "It's a consumption-based world", available online at <https://web.archive.org/web/20180918072543/https://www.hpe.com/in/en/services/it-consumption.html>, retrieved on Sep. 18, 2018, 9 pages.

Hewlett Packard Enterprise, "OpenStack for HP-UX", available online at <https://h20392.www2.hpe.com/portal/swdepot/displayProductInfo.do?productNumber=Z7550-02095>, Sep. 2018, 4 pages.

IBM; "Migrating KVM Compute Nodes" available online at <https://www.ibm.com/support/knowledgecenter/en/SST55W_4.3.0/liaca/liaca_migrating_kvm_computes.html>, 2018, 1 page.

Jessica Field, "Openstack Migrations with Gemini . . . Making Cloud Migrations Easy", Technical Documentation, available online at <https://aptira.com/openstack-migration/>, 2019, 9 pages.

OpenStack Documentation, "Install and configure a compute node", available online at <https://docs.openstack.org/nova/pike/install/compute-install.html>, retrieved on Mar. 5, 2020, 2 pages.

Openstack, "Removing a compute host", available online at <https://docs.openstack.org/openstack-ansible/newton/developer-docs/ops-remove-computehost.html>, May 9, 2018, 5 pages.

Openstack; "How to Move Compute-Node from One Cloud to Another Through Fuel?" available online at <https://ask.openstack.org/en/question/69075/how-to-move-compute-node-from-one-cloud-to-another-through-fuel/>, Jun. 28, 2015, 1 page.

Rightscale, "Multi-Cloud Platform", available online at <https://web.archive.org/web/20170322052348/https://www.rightscale.com/products-and-services/multi-cloud-platform>, Mar. 22, 2017, 4 pages.

Simon Dodsley, "Hints on using Cinder Manage with OpenStack Newton and later", available online at <https://blog.purestorage.com/hints-on-using-cinder-manage-with-openstack-newton-and-later/>, Aug. 17, 2017, 6 pages.

VMware, "VMware vSphere 5.1 vMotion Architecture, Performance, and Best Practices", Technical White Paper, 2012, pp. 1-21.

VMware, "VMware vSphere vMotion Architecture, Performance and Best Practices in VMware vSphere 5", Technical White Paper, 2011, pp. 1-26.

Wang et al., "A Decentralized Virtual Machine Migration Approach of Data Centers for Cloud Computing", Hindawi Publishing Corporation, 2013, pp. 1-11.

* cited by examiner

CONVERTING A FIRST CLOUD NETWORK TO SECOND CLOUD NETWORK IN A MULTI-CLOUD ENVIRONMENT

DESCRIPTION OF THE RELATED ART

A cloud network enables communication between components in a cloud computing infrastructure and external users, applications, or services. Resources and operations of the cloud network are centered on the cloud computing infrastructure. A cloud network that enables connection between a remote user and a cloud application may be referred to as a Software as a Service (SaaS) cloud network. A cloud network that enables connection between a remote user and a cloud infrastructure may be referred to as an Infrastructure as a Service (IaaS) cloud network.

A cloud network may include physical computing resources which may act as host systems, also called compute nodes. The cloud network may also include a storage pool formed of multiple storage systems which are part of the cloud network. A cloud network may further include a physical controller for controlling the operations of a cloud network. For example, a controller may be used to manage user request requests, route user requests to the appropriate node (e.g., compute, storage, or network node), perform load balancing functions on the cloud network, store cloud data on database servers, provide a unified access point for cloud services, provide scheduling services for choosing compute resources, provide API services, provide a web-based management dashboard, and provide other services. In some instances, to achieve high availability in the cloud network, multiple cloud controllers may be deployed.

Each compute node may deploy a hypervisor to enable one or more virtual machines (VMs) to be run on the compute node. A compute node may thus provide storage, networking, memory, and processing resources that can be consumed by virtual machines (VMs) hosted by the compute node. A hypervisor or a virtual machine monitor (VMM) may include software, firmware, hardware, or a combination thereof that can create and run VMs. Each VM running on a hypervisor may execute its own operating system (OS) and may be associated with a certain section of the storage pool. Each VM may run different applications and services. The hypervisor provides a virtual operating platform for the VMs, manages execution of the operating systems of the VMs, and enables sharing of virtualized hardware resources of the compute node among the VMs, such that different operating systems of different VMs can run on a single compute node.

Multiple cloud networks and storage resources are sometimes grouped in a single heterogeneous architecture referred to as a multi-cloud environment. In the multi-cloud environment, cloud assets, software, applications, etc., may be distributed across several cloud networks. The multi-cloud environment may include cloud networks or cloud hosting environments provided by different cloud service providers. In the multi-cloud environment, the different cloud networks may be managed by a multi-could management platform. The multi-cloud management platform includes hardware, software, firmware, or a combination thereof that provides a unified interface for deployment, provisioning, and monitoring of different cloud networks provided by different cloud service providers in the multi-cloud environment.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments.

The figures are not intended to be exhaustive or to limit various embodiments to the precise form disclosed.

DETAILED DESCRIPTION

Existing multi-cloud management platforms may not provide a direct method of converting an existing cloud network of one vendor to a cloud network of another vendor. Although some methods have been developed to migrate individual instances of VMs from one cloud network to another cloud network, such methods may be limited. In such instances, a user may be required to manually configure a destination cloud network where the VM will be moved with another set of resources such as an additional physical controller while the source cloud network (where the VM instance is originally present) is running. Thereafter, the user may need to manually move the individual VM instances, one-by-one, along with services and applications, from the source cloud network to the destination cloud network. Further complicating some implementations of such existing methods is the requirement to physically reconnect storage and network devices to other nodes that are part of the destination cloud. As such, present implementations of cloud network migration may be prone to human error, inefficient, require duplicate sets of resources, and cause service interruptions.

Various implementations of the disclosure are directed to addressing these and other problems that may arise during migration of one cloud network provided by a service provider to another cloud network provided by another service provider. In accordance with implementations described herein, systems and methods may be provided for seamlessly converting an existing cloud network of one service provider to a cloud network of another service provider. The systems and methods may be used to automate most or all of the process of cloud network conversion, including the movement of controllers, compute nodes, storage, and other resources that are part of an existing cloud network to another cloud network. In some implementations, to convert one cloud network to another cloud network, a user may send a request to multi-cloud management software of a multi-cloud management platform to initiate the conversion, and the software may automatically proceed with the conversion process without impacting or providing minimal impact to any active VM instances or data, and without impacting the end user. These and other benefits that may be realized by the technology described herein are further described below.

Figure 1:
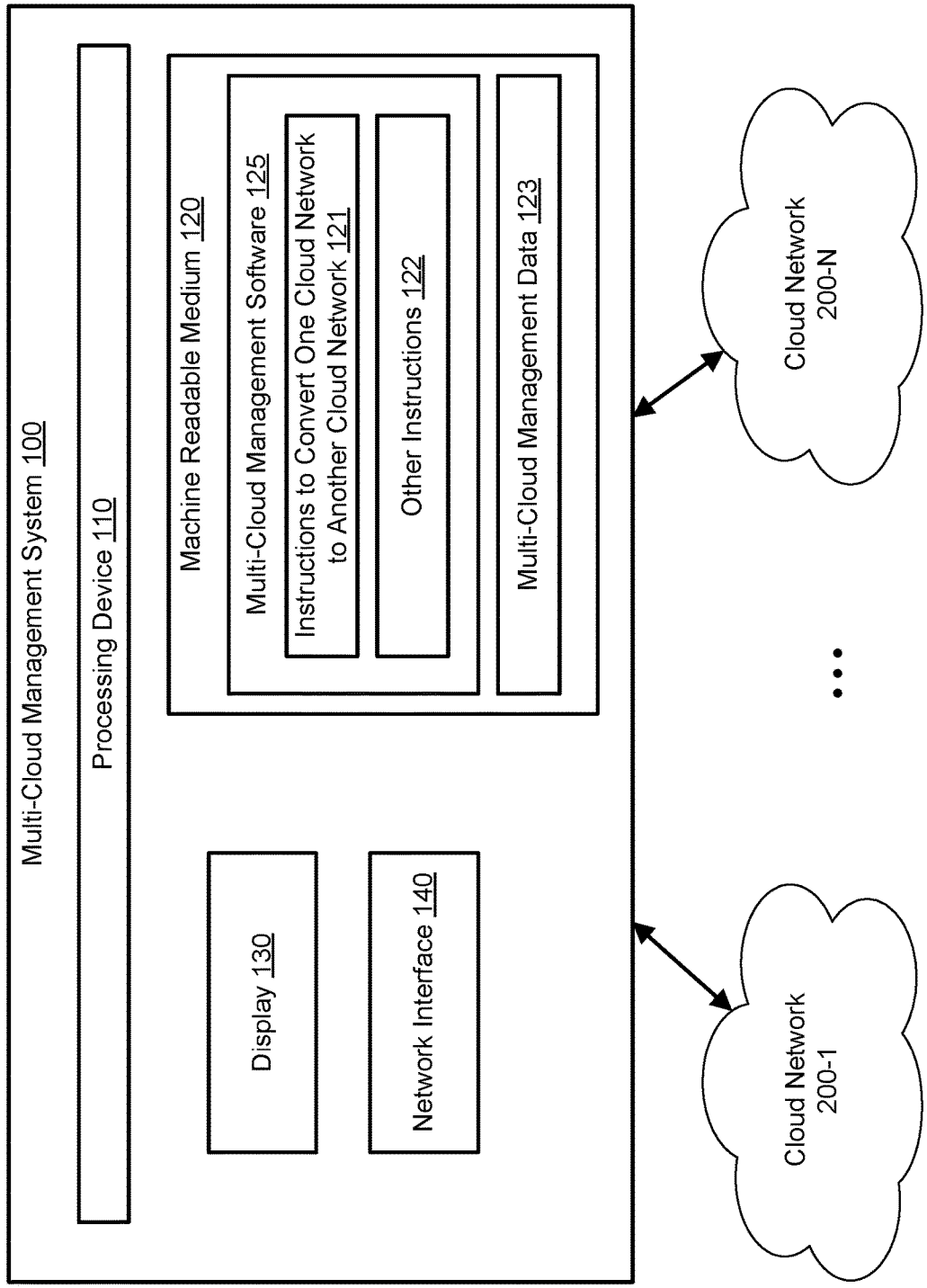
FIG. 1 illustrates an example multi-cloud environment in which automatic cloud network conversion may be implemented in accordance with implementations of the disclosure.

FIG. 1 illustrates an example multi-cloud environment in which automatic cloud network conversion may be implemented in accordance with implementations of the disclosure. In this example environment, a multi-cloud management system 100 may provide a user a common access point to access and manage multiple cloud networks 200-1 to 200-N (individually referred to as a "cloud network 200"). Each cloud network 200 has cloud hosting capabilities associated with a particular provider. For example, cloud network 200-1 may be provided by a first cloud service provider and cloud network 200-N may be provided by a second cloud service provider. Example cloud networks that may be accessed by multi-cloud management system 100 include cloud networks based on SUSE OPENSTACK, RED HAT CLOUD, HPE HELION OPENSTACK, IBM CLOUD, and the like.

Multi-cloud management system 100 may be implemented as any computing device that runs a multi-cloud management platform in a multi-cloud environment. For example, system 100 may be implemented as an electronic device such as a desktop computing device, a server, a mobile computing device such as a laptop, tablet, or smartphone, or some combination thereof. As shown, multi-cloud management system 100 may include a processing device 110, a machine readable 120, a display 130, and a network interface 140.

Machine readable medium 120 may store multi-cloud management software 125 that includes instructions that are executable by processing device 100 to implement a multi-cloud management platform in the multi-cloud environment. For example, in one particular implementation, multi-cloud management software 125 may be implemented as HPE ONESPHERE. Multi-cloud management software 125 may include instructions 121 that are executable by a processing device 110 to cause the conversion of one cloud network offered by a service provider to another cloud network offered by another service provider. Further, multi-cloud management software 125 may include other instructions 122 that are executable to perform other multi-cloud management functions such as accessing, controlling, and/or viewing the various cloud networks 200-1 to 200-N, including their associated resources such as compute node(s), controller(s), and storage.

Machine readable medium 120 may further store multi-cloud management data 123. The data 123 may serve, among other things, as a repository for storing data that is fetched, processed, received or generated during use of multi-cloud management software 125. It should be appreciated that although the example of FIG. 1 depicts one machine readable medium 120 storing multi-cloud management software 125 and multi-cloud management data 123, the instructions and data associated with multi-cloud management may be distributed across multiple machine readable mediums associated with one or more machines.

Multi-cloud management system 100 may additionally include a display 130 for presenting a user interface to a user (e.g., a graphical user interface (GUI) or command line interface (CLI)) utilizing multi-cloud management software, and an network interface 140 for accessing cloud networks 200-1 to 200-N or other resources needed for multi-cloud management. Some non-limiting examples of communication methods that may be implemented by network devices in accordance with the disclosure may include: wired communications methods, such as cable, fiber-optic, or DSL; or wireless communications methods, such Wi-Fi, cellular communications, or satellite communications, or some combination thereof.

Figure 2:
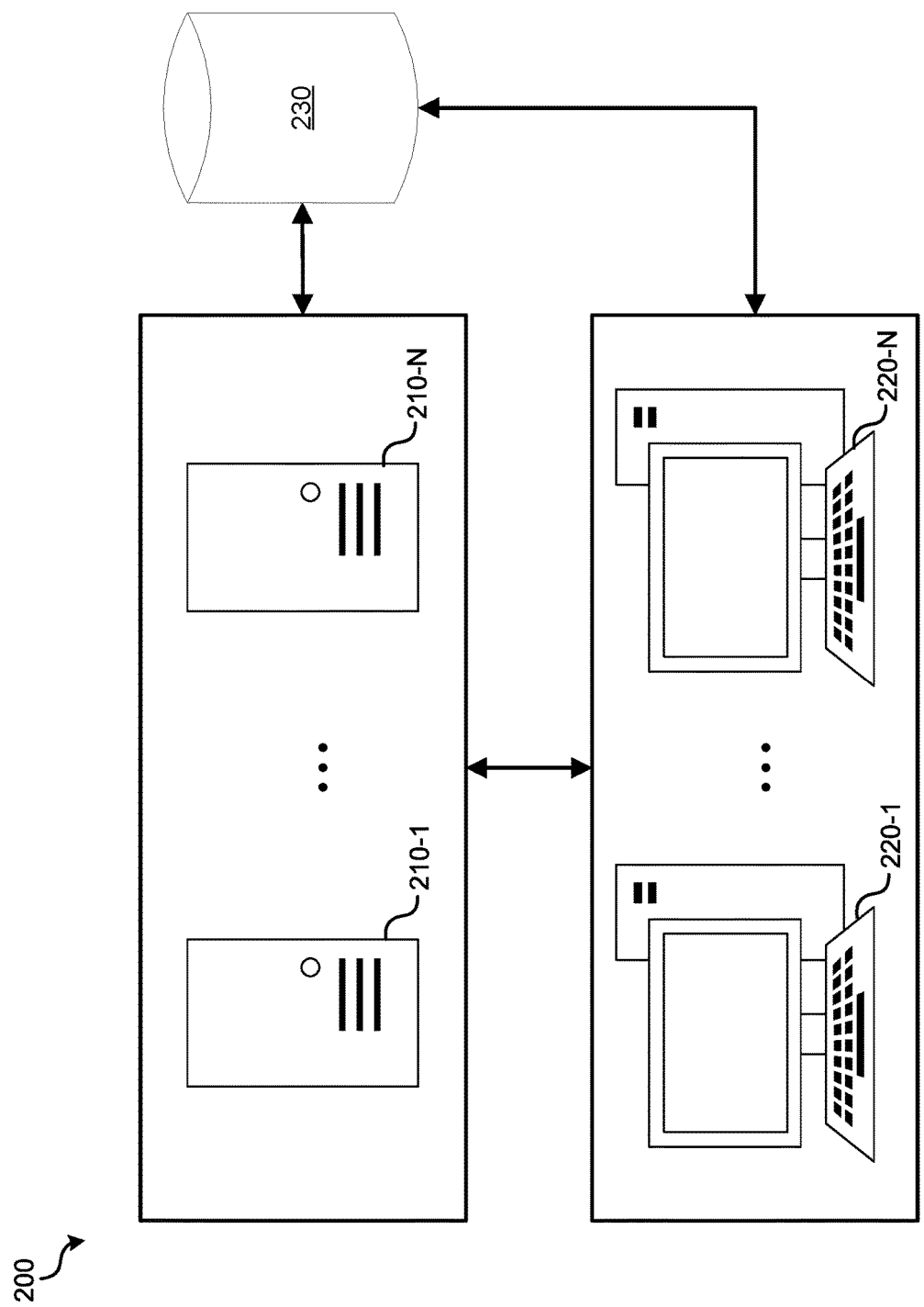
FIG. 2 is a block diagram illustrating an example architecture of a cloud network, in accordance with implementations of the disclosure.

FIG. 2 is a block diagram illustrating an example architecture of a cloud network 200, in accordance with implementations of the disclosure. As shown in FIG. 2, a cloud network 200 may include controllers 210-1 to 210-N (individually referred to as a "controller 210"), compute nodes 220-1 to 220-N (individually referred to as a "compute node 220"), and a data storage device 230. Each controller 210 may manage operations of the compute nodes 220 in the cloud network 200. Although, the first cloud network 202 is shown to include at least two cloud controllers, there may be just one cloud controller, or multiple cloud controllers in the cloud network 200. Each compute node 206 may host one VM or more than one VM. Although the example of FIG. 2 illustrates a cloud network 200 including at least two compute nodes, it should be appreciated that cloud network 220 may include one compute node or more than two compute nodes. Each of the compute nodes may have a respective storage volume of the data storage device 230 associated with it. Although, cloud network 200 is shown to include one data storage device 230, there may be more than one data storage device in the cloud network 200.

Referring again to multi-cloud management system 100 of FIG. 1, a user of multi-cloud management system 100 may desire to move infrastructure resources (e.g., controllers, compute nodes, etc.) from one cloud network provider to another cloud network provider for various reasons such as performance improvement, cost reduction, reliability, etc. To this end, multi-cloud management software 125 may include instructions 121 that are executable by a processing device 110 to automate the conversion from a source cloud network (i.e., the cloud network from which resources are migrated) to a destination cloud network (i.e., the cloud network to which resources are being migrated). Further, as described below, the conversion may be performed in an online manner that preserves the applications and workload present on the source cloud network during and after the conversion. Resources such as controllers, compute nodes, storage devices, etc. that are configured for use with an existing source cloud network associated with a first service provider may be converted for use with a destination cloud network associated with a second service provider.

Figure 3:
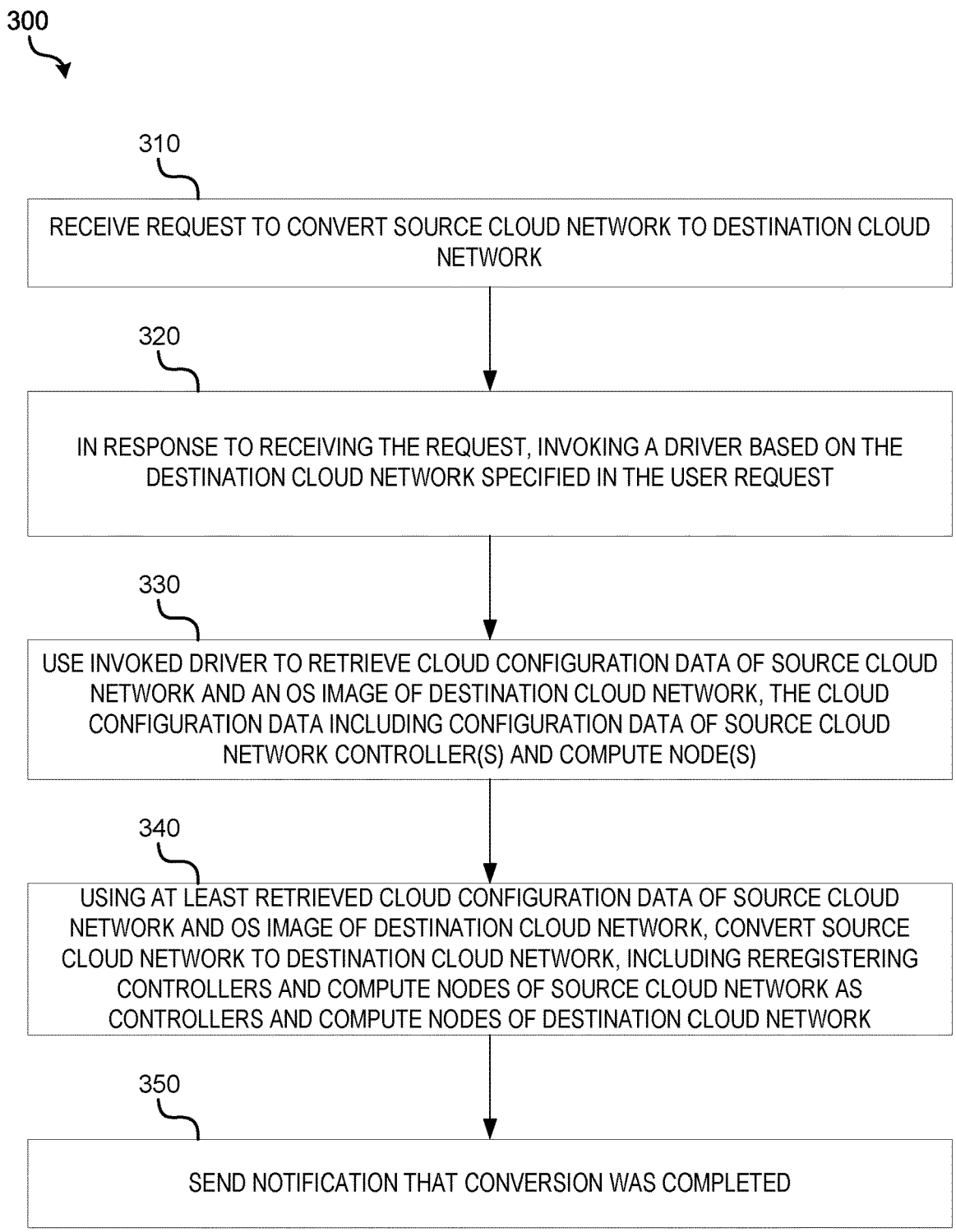
FIG. 3 is an operational flow diagram illustrating an example method for converting a source cloud network to a destination cloud network in response to a user request, in accordance with implementations of the disclosure.

FIG. 3 is an operational flow diagram illustrating an example method 300 for converting a source cloud network to a destination cloud network in response to a user request, in accordance with implementations of the disclosure. In implementations, some or all of the operations of method 300 may be implemented by a processing device 110 executing instructions 121 stored on a machine readable medium 120.

At operation 310, a user request is received to convert a source cloud network to a destination cloud network. For example, a user request may be initiated through software of a multi-cloud management platform as discussed above. The user may send the request through a GUI or CLI of multi-cloud management software, or any other mechanism that may be used to send user requests to multi-cloud management software, to convert an existing IaaS cloud network to different IaaS cloud network. In some instances, prior to the user request, the destination cloud network may be an existing destination cloud network that already includes a controller configured with services of the destination cloud network. In such instances, the user request to convert the source cloud network to a destination cloud network may be a user request to merge the source cloud network with the existing destination cloud network (e.g., moving controller and compute node of the source cloud network to the existing destination cloud network). In other implementations, the destination cloud network may not be configured.

At operation 320, in response to receiving the request, a driver is invoked based on the destination cloud network specified in the user request. As further described below, the invoked driver may be used to install and setup controller nodes and other resources for a particular service provider. The invoked driver may include different application programming interfaces (APIs) that may be used to interact with the destination cloud network and the source cloud network. It may include a set of instructions that may interact with and execute operations on the source cloud network and destination cloud network.

Figure 4:
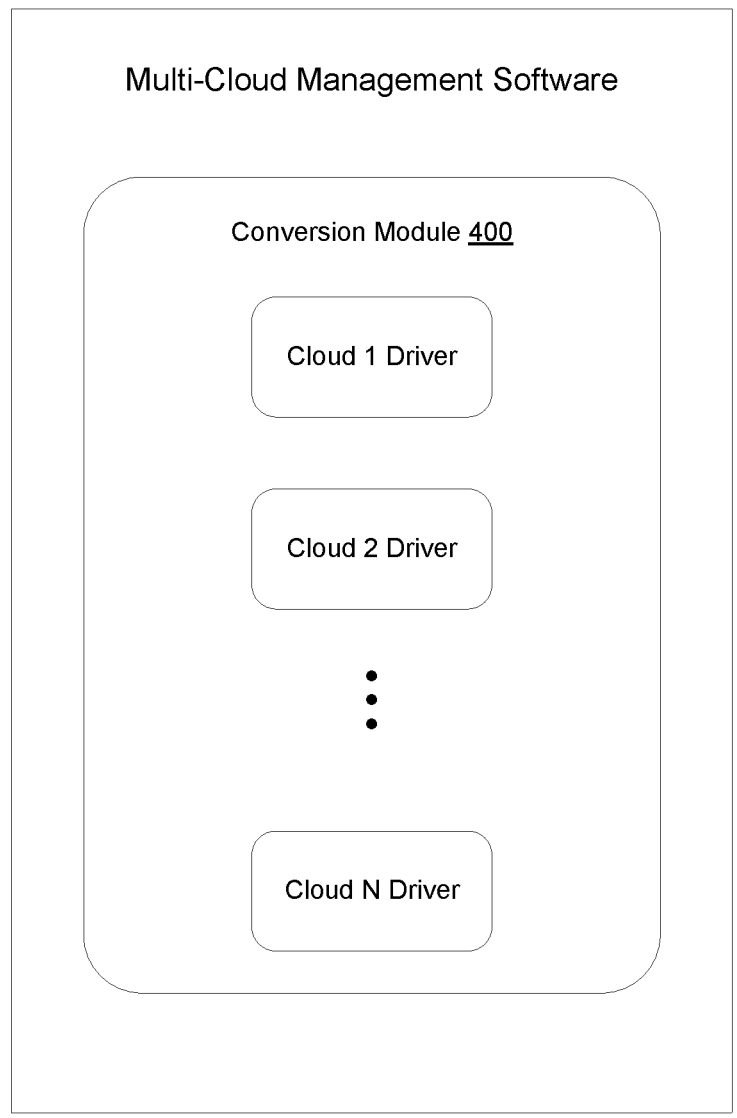
FIG. 4 depicts an example implementation of a conversion module including N cloud drivers, in accordance with implementations of the disclosure.

In implementations, a conversion module is invoked at operation 320 upon receiving the user request to convert to a destination cloud network. The conversion module may be a component of the multi-cloud management platform that is responsible for converting from a source cloud network to a destination cloud network. The conversion module may include routines, programs, components, data structures, and the like that perform particular tasks or implement particular abstract data types. The conversion module may contain different drivers within itself to handle different destination cloud network providers. FIG. 4 depicts an example implementation of a conversion module 400 including N cloud drivers. For example if a user desires to move to a cloud 2 network, then the cloud 2 driver present in the conversion module may be invoked to install and bring up a controller of the cloud 2 network and perform other operations to convert to the cloud 2 network. In some implementations, the conversion module 400 may be a component of instructions 121.

At operation 330, the invoked driver is used to retrieve cloud configuration data of the source cloud network and an OS image of the destination cloud network, including configuration data of the source cloud network controller(s) and compute node(s). Example source cloud network configuration data that may be retrieved includes IP addresses of controller nodes and compute nodes, integrated lights-out (iLO) details of the controllers (e.g., iLO credentials), storage server details, network details, a list of required cloud services of the source cloud network, and other configuration data. The configuration data may be retrieved from one or more configuration files utilized by the source cloud network. In some implementations, if configuration data is not available, the driver may prompt the user (e.g., through a GUI or CLI) to provide the configuration data.

The OS image (e.g., .iso file) of the destination cloud network may be retrieved from an image store that stores and manages the images of OSes corresponding to cloud networks of service providers that are utilized by a user of system 100. For example, the image store may be maintained at multi-cloud management system 100. Alternatively, the driver may request that the user upload the image of the destination cloud network.

At operation 340, using at least the retrieved cloud configuration data of the source cloud network and the OS image of the destination cloud network, a conversion from the source cloud network to the destination cloud network may be performed, the conversion including reregistering controllers and compute nodes of the source cloud network as controllers and compute nodes of the destination cloud network. For example, as further described below, the conversion process may include operations of reimaging source cloud network controllers and installing the OS image on the controllers, moving compute nodes from the source cloud network to the destination cloud network without interrupting service, and other operations. The conversion process that is followed at operation 340 may differ depending on whether or not a destination cloud network is already configured prior to receiving the user request to convert, and whether the source cloud network is configured with one or more than one controller. Methods 600 and 800, further described below with reference to FIGS. 5-8, further illustrate example conversion processes.

At operation 350, a notification is sent to the user providing an indication that the conversion was completed. The notification may indicate that the conversion was successful and/or that some issues were encountered. In instances where a destination cloud network is already configured prior to receiving the user request to convert, the notification may indicate that the source cloud network successfully merged with the destination cloud network.

Figure 5:
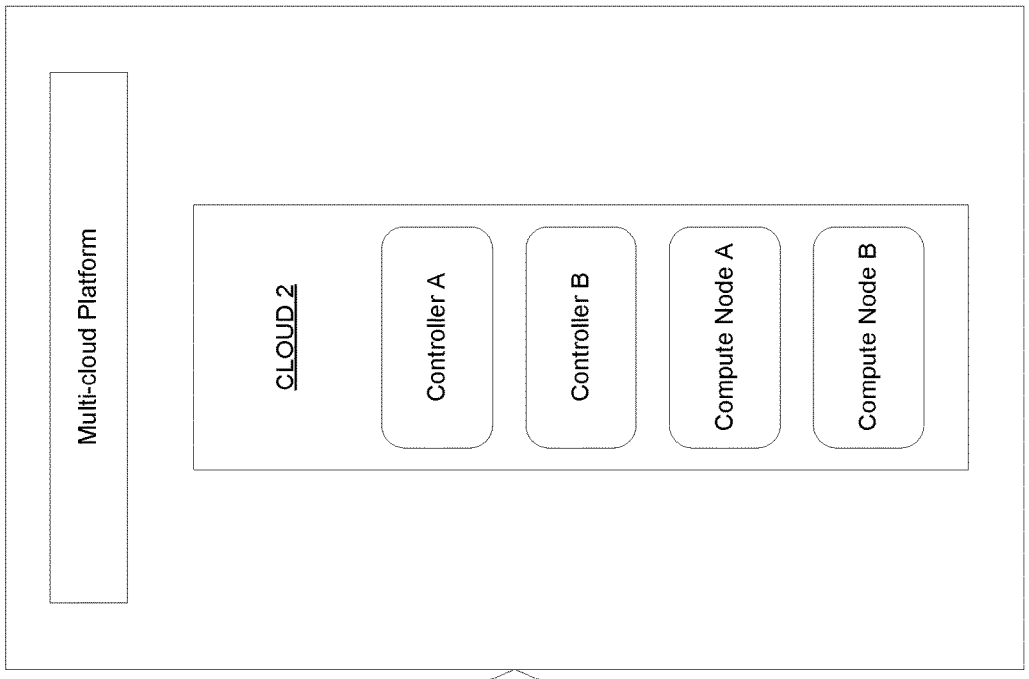
FIG. 5 depicts a multi-cloud platform before and after conversion from a first cloud network to a second cloud network, in accordance with implementations of the disclosure.
Figure 5:
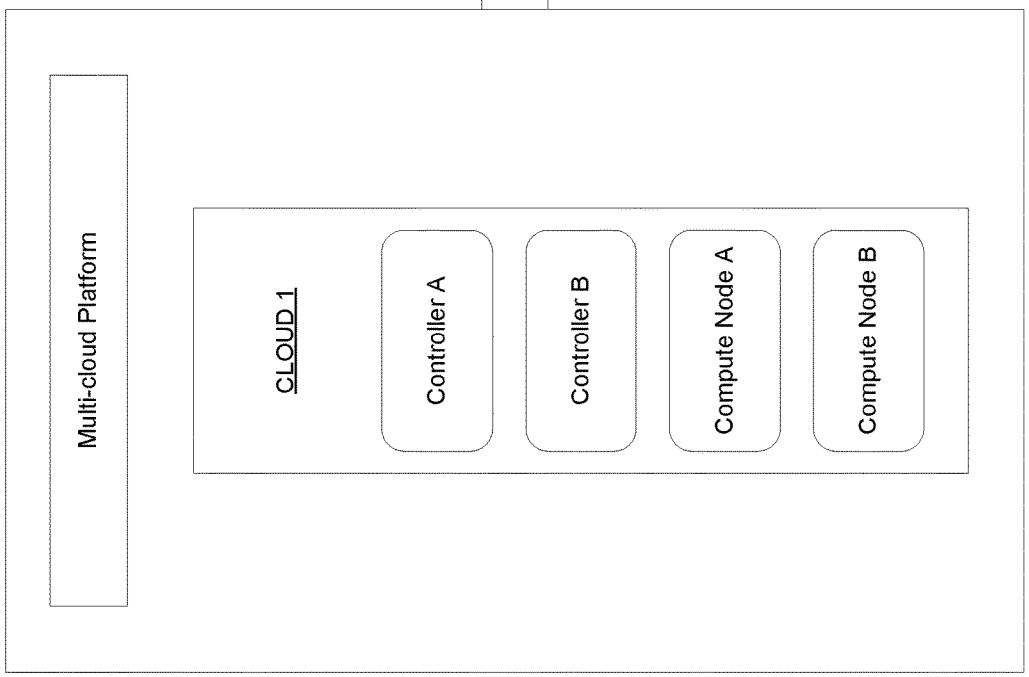

As noted above, in some instances a user may wish to convert a source cloud network having two or more controllers to a destination cloud network that is not currently configured. This scenario is illustrated by FIG. 5, which depicts a multi-cloud platform before and after conversion from a first cloud network to a second cloud network. As depicted before conversion, the multi-cloud platform is configured with a first cloud network having controllers A and B, and compute nodes A and B. After conversion, the multi-cloud platform is configured with a second cloud network having controllers A and B, and compute nodes A and B.

Figure 6:
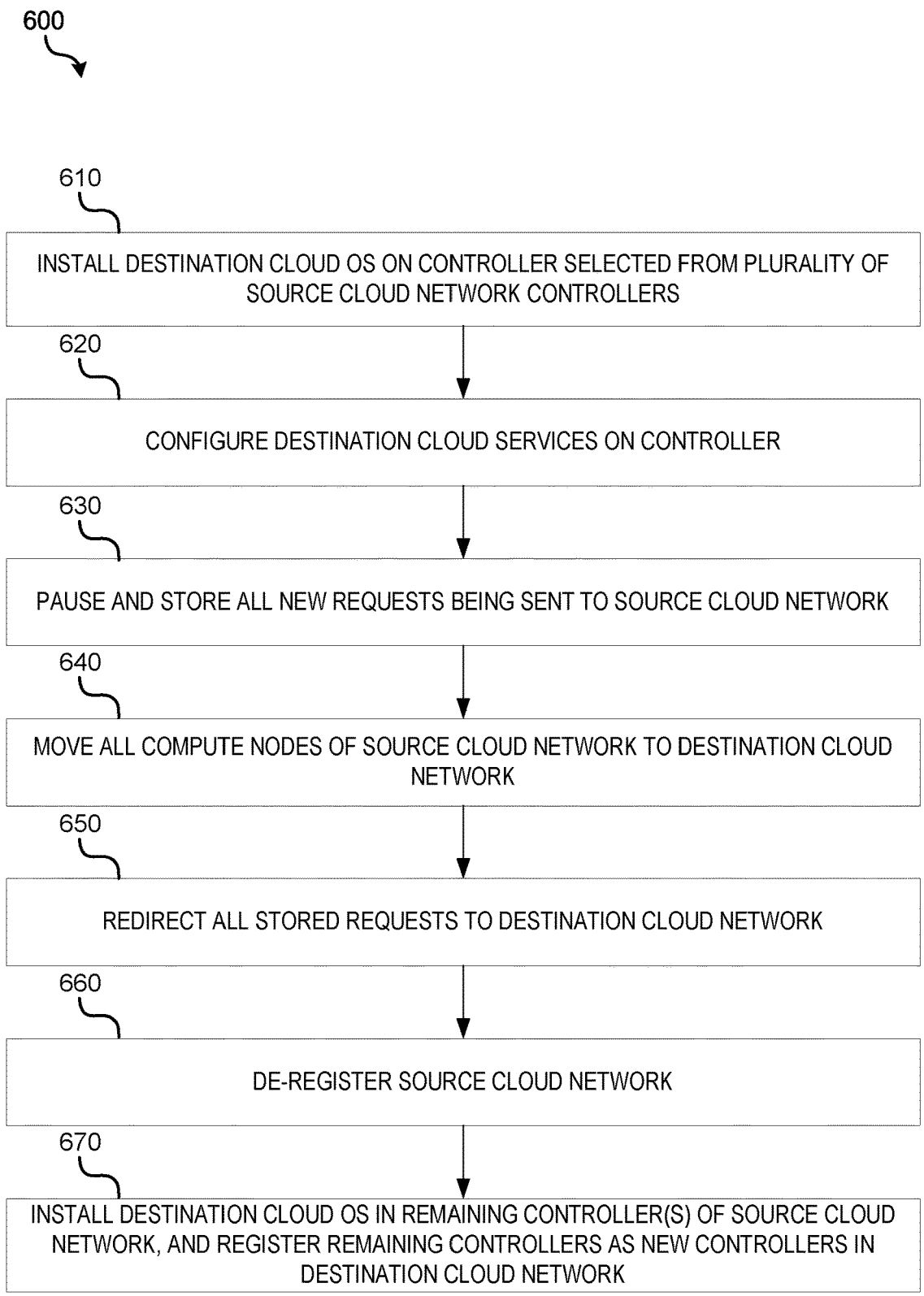
FIG. 6 is an operational flow diagram illustrating an example method for converting a source cloud network to a destination cloud network in scenarios where the source cloud network has a plurality of controllers, in accordance with implementations of the disclosure.

FIG. 6 is an operational flow diagram illustrating an example method 600 for converting a source cloud network to a destination cloud network in scenarios where the source cloud network has a plurality of controllers, in accordance with implementations of the disclosure. In implementations, some or all of the operations of method 600 may be implemented by a processing device 110 executing instructions 121 stored on a machine readable medium 120. The one or more operations of method 600 may be implemented after operation 330 and before operation 350 of method 300.

At operation 610, the destination cloud OS is installed on a controller selected from the plurality of source cloud network controllers. The controller may be automatically selected based on factors such as the current processing load of each of the plurality of controllers, the number of services (e.g., network or storage services) being managed by each controller, the role assigned to each controller (e.g., "primary" versus "secondary"), and/or other factors. In some implementations, the controller may be randomly selected (e.g., when the plurality of controllers run the same duplicate services).

The installed destination cloud OS may be installed using the image that was retrieved at operation 330. The selected controller may be reimaged and the OS installed using any suitable OS installation mechanism. For example, using the controller's iLO and the iLO credentials that were retrieved from the source cloud network at operation 330, the driver may install an iso image of the OS on the controller. During the course of installation, other controllers and compute nodes may continue to operate in the existing source cloud network without any or significant impact. By virtue of there being multiple controllers in the source cloud network, the remaining controllers may continue to provide the same services while the selected controller is configured to operate on the destination cloud network.

At operation 620, destination cloud services may configured on the controller. In implementations, scripts that are present in the installed OS may be triggered to configure the controller for operation and bring up destination cloud services (e.g., network services, storage services, etc.) on the controller. Additionally, the controller may be registered with the destination cloud network. During registration, a controller node database in the destination cloud network may be updated to include a controller identifier of the controller. The controller node database may store a list of controllers grouped under the destination cloud network. The new destination cloud network may be up and running on the controller after operation 620.

At operation 630, all new requests being sent to the source cloud network that need to be executed by a controller may be paused and stored in preparation for moving the compute nodes of the source cloud network to the destination cloud network. For example, requests coming into the source cloud network such as requests to create new VMs, delete existing VMs, perform network updates, modify controller services, remove or add compute nodes, etc., may be paused until all resources of the source cloud network are moved to the destination cloud network. The multi-management cloud software may continue to accept new requests. Instead of routing these new requests to the source cloud network, it may store these requests in its database or in any data storing application using a suitable file format (e.g., flat file, XML, XLSX, etc.) that may be later retrieved and executed. The stored requests may take the form of commands, REST APIs, or some other form.

At operation 640, all compute nodes of the source cloud network are moved to the destination cloud network. The compute nodes may be moved one-by-one without impacting VM instances and application data that is currently being utilized. Particular methods for moving a compute node from a source cloud network to a destination cloud network are further described below with reference to FIG. 9.

At operation 650, all stored requests are redirected to the destination cloud network. For example, the stored requests stored in the database or other data storing application may be routed to the destination cloud network for execution. In implementations where the format of the source cloud network's requests are different from the destination cloud network's requests, the requests that are stored may be converted to the destination cloud network's request format during redirection. As such, the requests may be re-routed in the appropriate format based on the cloud service provider.

At operation 660, the source cloud network is de-registered from the multi-cloud management software. The source cloud network may be deregistered by invoking one or more APIs provided by the multi cloud management software. Deregistration of the cloud network may take place while the redirected requests are executed in the destination cloud network. In some implementations, operation 660 may be skipped.

At operation 670, the destination cloud OS is installed in the remaining controller(s) of the source cloud network. For example, using the previously retrieved OS image, the remaining controllers may be reimaged. Thereafter, the remaining controllers may be registered as new controllers in the destination cloud network, and all cloud services may function on the newly registered controllers. Registration of the new controllers may be done by invoking one or more APIs provided by the multi-cloud management software for registration. For example, the controller node database as discussed above may be updated.

While method 600 is performed to convert the source cloud network to the destination cloud network, a user may continue to use VM instances and the workload deployed on the VM instances using IP addresses assigned to the VMs, or using any other login mechanism.

Figure 7:
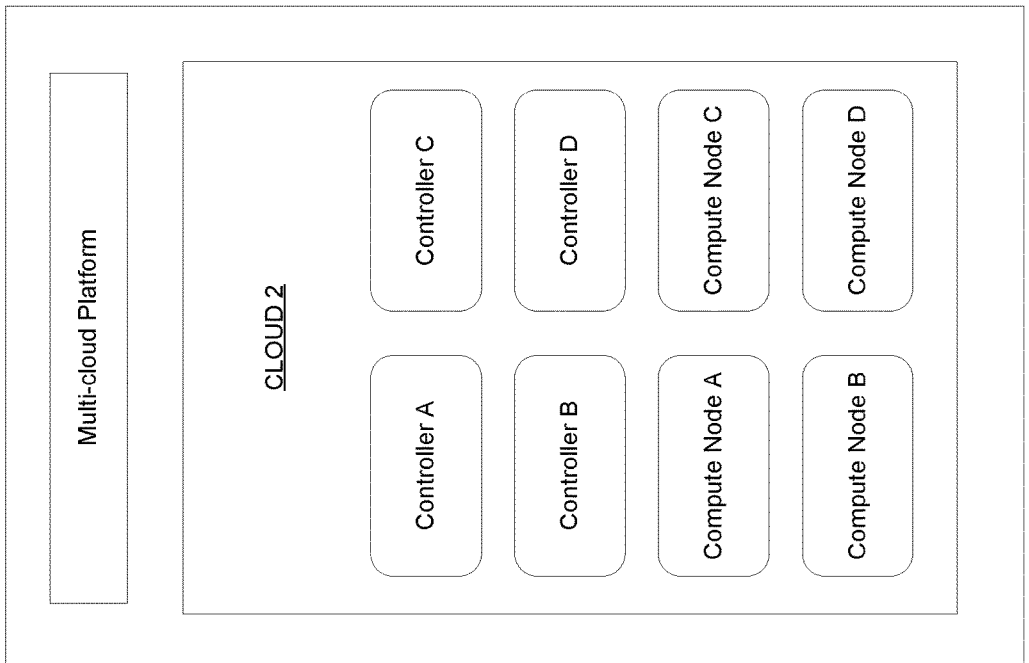
FIG. 7 depicts a multi-cloud platform before and after conversion from a first cloud network to a second cloud network, in accordance with implementations of the disclosure.
Figure 7:

It should be appreciated that method 600 may be optimized, generalized, or modified to support various cloud service providers. For example, in some instances a user may wish to convert or merge a source cloud network having two or more controllers to a destination cloud network that is already configured. A user may have two different cloud networks already configured under the multi-cloud management software. For some reason, the user may desire to move all of the resources present in one of the configured clouds to the other configured cloud without effecting the VM instances and workload deployed on it. This scenario is illustrated by FIG. 7, which depicts a multi-cloud platform before and after conversion from a first cloud network to a second cloud network. As depicted before conversion, the multi-cloud platform is configured with a first cloud network having controllers A and B, and compute nodes A and B, and a second cloud network having controllers C and D, and compute nodes C and D. After conversion/merging, the multi-cloud platform is configured with just the second cloud network having controllers A, B, C, and D, and compute nodes A, B, C, and D. In the scenario depicted by FIG. 7, as the destination cloud network is already configured with cloud services prior to the user request to convert, operations 610-620 of method 600 may be skipped. That is, conversion may be performed by following operations 630-670 as described above. It should be appreciated that in instances in which the destination cloud network is already configured with a controller, the above conversion process may also be utilized when the source cloud network has a single controller.

Figure 8:
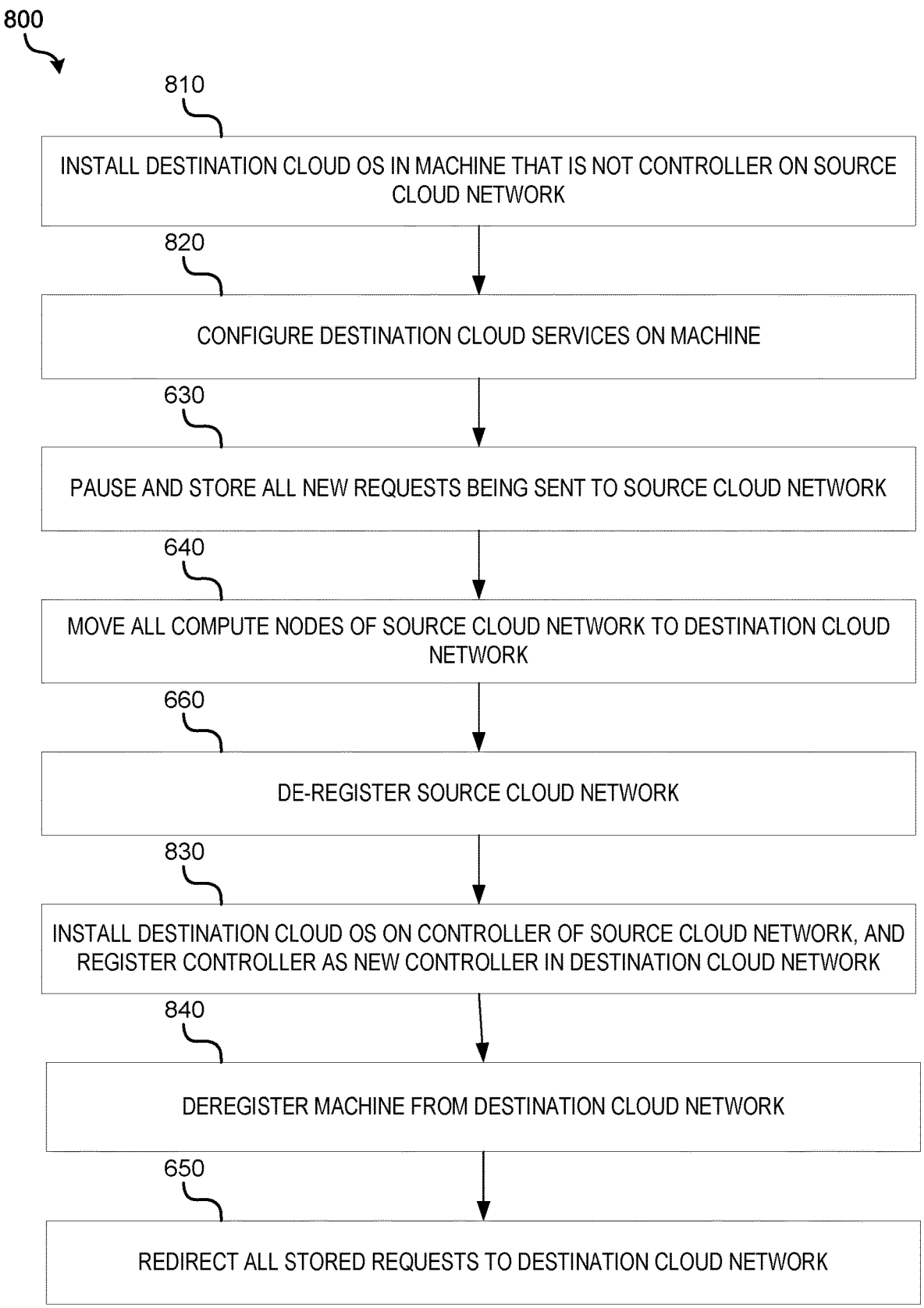
FIG. 8 is an operational flow diagram illustrating an example method for converting a source cloud network to a destination cloud network in scenarios where the source cloud network has a single controller, in accordance with implementations of the disclosure.

Although it may be common for enterprises to use multiple controllers in their cloud network for reasons of providing high availability, a failover mechanism, reliability, etc., in some instances there may be a configuration where the source cloud network only has one controller. FIG. 8 is an operational flow diagram illustrating an example method 800 for converting a source cloud network to a destination cloud network in scenarios where the source cloud network has a single controller, in accordance with implementations of the disclosure. In implementations, some or all of the operations of method 800 may be implemented by a processing device 110 executing instructions 121 stored on a machine readable medium 120. The one or more operations of method 800 may be implemented after operation 330 and before operation 350 of method 300.

In method 800, where only one controller is used by the source cloud network, an additional physical machine (e.g., a physical server) or VM is used to perform the conversion. At operation 810, the destination cloud OS is installed on the additional machine (e.g., physical server or VM) that is not part of the source cloud network. The installed destination cloud OS may be installed using the image that was retrieved at operation 330. The machine may be reimaged and the OS installed using the machine's iLO. In some implementations of operation 810, the user may be queried to retrieve additional details of the machine (e.g., IP address, iLO credentials) such that the additional machine may be accessed. During the course of installation, the existing controller and compute node(s) may continue to operate in the existing source cloud network without impact.

At operation 820, destination cloud services may configured on the machine. In implementations, scripts that are present in the installed OS may be triggered to configure the machine for operation and bring up destination cloud services (e.g., network services, storage services, etc.) on the machine. Additionally, the machine may be registered with the destination cloud network. The new destination cloud network may be up and running on the machine after operation 820. Thereafter, operations 630 (pausing and storing all new requests being sent to source cloud network), 640 (moving all compute nodes), and 660 (de-registering the source cloud network) may be performed in a manner similar to that discussed above, except that in this example the machine acts as a temporary controller.

At operation 830, the destination cloud OS is installed in the single controller of the source cloud network. For example, using the previously retrieved OS image, the controller is reimaged. Thereafter, the controller may be registered as a new controller in the destination cloud network, and all cloud services may function on the newly registered controller. Registration of the new controller may be done by invoking one or more APIs provided by the multi-cloud management software for registration.

At operation 840, once the controller is registered, the additional machine may by deregistered and released back to the user (e.g., by invoking one or more APIs provided by the multi-cloud management software). As such, in this example, the additional physical machine or VM may be used as a temporary controller of the destination cloud network until the conversion is complete. Alternatively, it may be maintained as a controller of the destination cloud network, and operation 840 may be skipped.

At operation 650, all stored requests are redirected to the destination cloud network as described above. In some implementations, operation 650 may be performed before operation 830.

Figure 9:
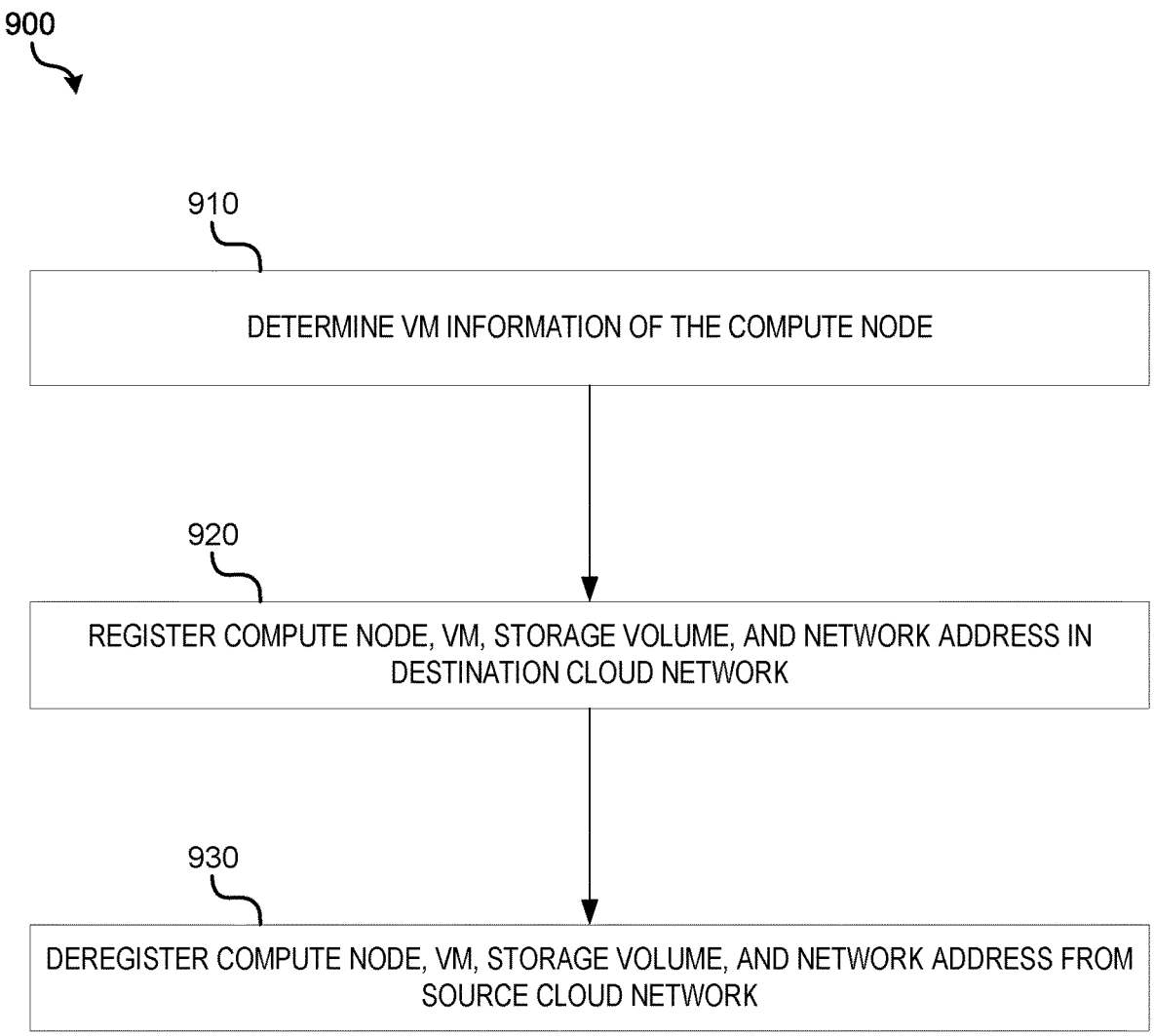
FIG. 9 is an operation flow diagram illustrating an example method for moving a compute node from a source cloud network to a destination cloud network, in accordance with implementations of the disclosure.

FIG. 9 is an operational flow diagram illustrating an example method 900 for moving a compute node from a source cloud network to a destination cloud network, in accordance with implementations of the disclosure. In implementations, some or all of the operations of method 900 may be implemented by a processing device 110 executing instructions 121 stored on a machine readable medium 120. The one or more operations of method 900 may correspond to operation 640 described above.

As previously discussed, during operation 330, a driver may be invoked to retrieve cloud configuration data of the source cloud network, including configuration data of the compute nodes of the source cloud network. The retrieved data for each compute node may include, for example, a network identifier such as an IP address, a compute node identifier, such as a MAC address, and a unique identifier, such as a Globally Unique Identifier (GUID), of the destination cloud network.

At operation 910, a virtual machine (VM) information of the compute node is determined. The VM information indicates a VM hosted at the compute node in the source cloud network, a storage volume associated with the VM, and a network address associated with the VM. In an example, the VM information may include an identifier of the VM, such as a GUID, memory pointers identifying the storage volume associated with the VM and an IP address associated with the VM. In an example, the VM information may indicate a list of VMs hosted at the compute node in the source cloud network along with respective storage volumes and network address of the VMs.

On determining the VM information, the compute node may be set up in a quiesce mode in the source cloud network. In the quiesce mode, requests related to updating of at least one of the VM, the storage volume, and the network address are paused from being processed in the source cloud network. In the quiesce mode, the compute node remains in an online state and is available to receive requests related to updating the VM, the storage volume associated with the VM, and the network address associated with the VM. Thus, the compute node is in an online state during the cloud migration, where in the online state the compute node is available to receive requests related to updating of at least one of the VM, the storage volume, and the network address, although such requests may not be processed during the migration.

At operation 920, the compute node, the VM, the storage volume, and the network address is registered in the destination cloud network. In an example, once the compute node, the VM, the storage volume, and the network address is registered in the destination cloud network, the VM is associated with the storage volume and the network address.

During registration, a compute node database in the destination cloud network may be updated to include a compute node identifier of the compute node. The compute node database may store a list of compute nodes grouped under the destination cloud network. Additionally, a VM database in the destination cloud network may be updated to include a VM identifier of the VM as indicated in the VM information. The VM database may store a list of VMs created in each of the computes nodes grouped under the destination cloud network. Further, a storage volume database in the destination cloud network may be updated to include a storage volume identifier of the storage volume as indicated in the VM information. The storage volume database stores a list of storage volume identifiers associated with VMs created in the destination cloud network. Moreover, a network address database in the destination cloud network may be updated to include the network address as indicated in the VM information. The network address database stores a list of network addresses associated with VMs created in the destination cloud network.

At operation 930, the compute node, the VM, the storage volume, and the network address are deregistered from the source cloud network. In an example, identifiers associated with the compute node, the VM, the storage volume, and the network address are removed from respective databases of the source cloud network to perform the deregistration.

In an example, upon the compute node, the VM, the storage volume, and the network address being deregistered from the source cloud network, the compute node may be set in a normal operation mode in the destination cloud network. In the normal operation mode, the compute node is online and may process network/VM/storage update requests, when they are received without processing of such requests being paused. Thus, the compute node is moved out of the quiesce mode. Thus, after the compute node, the VM, the storage volume, and the network address are deregistered from the source cloud network, the requests related to updating of at least one of the VM, the storage volume, and the network address which were received while the compute node was in the quiesce mode, may be processed.

Particular systems and methods for migrating a compute node from a source cloud network to a destination cloud network are described in further detail in co-pending U.S. patent application Ser. No. 16/118,205, titled "Cloud Migration," which is incorporated herein by reference in its entirety.

Implementation Example

By way of particular example, one method that may be implemented in accordance with the disclosure to convert a source IaaS cloud network to a cloud network is described below. The conversion process may begin with the user sending a request to the multi-cloud management software to convert an existing IaaS cloud network to the target IaaS cloud network. Upon receiving the request, the multi cloud management software may invoke a conversion module to perform the conversion. A "target_cloud" driver present in the conversion module may be invoked. The invoked driver may retrieve all the configuration information (e.g., from the configuration file) of the existing source IaaS cloud network, including IP addresses, storage details, iLO details, etc. In cases where OPENSTACK is utilized, this configuration information may be present in "conf" files such as nova-.conf, nova-compute.conf, cinder.conf, neutron.conf, etc. If certain information may not be retrieved from these files, the driver may prompt the user to provide the information. Retrieval and processing of this configuration information may be implemented specifically based on the cloud service provider.

After the driver retrieves the required configuration information, the conversion module may request that the user upload the OS image of the destination cloud network. In this example, the user may upload an iso image of the OS of the target cloud network. Using the iLO credentials that were retrieved from the source cloud network during configuration data retrieval, the driver may install the iso image on one of the controllers of the source IaaS cloud network. While the controller is reimaged, the remaining controllers and the compute nodes of the source IaaS cloud network may continue to operate without impact.

After installation of the OS on the selected controller, the target_driver may configure cloud services on the selected controller by triggering scripts or other code present in the OS. For example, the target_cloud driver may add the configuration details present in configuration files (e.g., server configuration files, network configuration files, etc.) Configuration details may be added to configuration files through scripts or by copying (e.g., using the scp command) the readymade configuration files to the controller. After adding the configuration details, the target_cloud driver may invoke scripts on the controller to bring up cloud services.

After executing the scripts, the destination cloud service may be running in the selected controller. Afterward, all the compute nodes may be moved from the source IaaS cloud network to the destination IaaS cloud network (i.e., the target cloud network in this example). Any new requests such as VM creation, VM deletion, network updates, etc., coming in to the source IaaS cloud network may be paused until all the resources of the source IaaS cloud network are moved to the destination IaaS cloud network. The multi-management cloud software may continue to accept new requests. Instead of routing these requests to the source IaaS cloud network, it may store these requests in its database or in any data storing application using a suitable file format such as a flat file, XML, XLSX, etc. Requests received during the movement of resources to destination IaaS cloud may be stored in a database. Table 1, below, illustrates an example format in which the requests may be stored.

TABLE 1

| Request_id (int) | Requests(varchar) |
|---|---|
| 1 | Create VM with flavor < flavor id> and network <network id> VM name |
| 2 | Delete VM with name <instance name> |
| 3 | Create volume with size <size> name <name> |

The conversion module may then move all the compute nodes along with their resources to the destination cloud network. After moving all the resources to the destination cloud network, the conversion module may retrieve the paused requests stored in the database and route them to the new destination IaaS cloud network for execution. If the format of the source IaaS cloud network's command is different from the destination IaaS cloud network's command then a "command converter" module may be implemented to convert the commands of the source IaaS cloud network that are stored in the database to the destination IaaS cloud network's command format. The command converter may convert the source IaaS cloud network's commands to the destination IaaS cloud network's command format. The requests need not only be in the form of commands. For example, if the requests are in the form of REST API, they may be stored in database, converted and sent to the destination cloud network. The requests may be re-routed in the appropriate format based on the cloud service provider. For example, if a source IaaS cloud network's command to create a VM is: (command:1) create instance <instance name> flavor <flavor id> network <network id> and a destination IaaS cloud network's command to create VM is: (command:2) create server flavor <flavor id > network <network id> <instance name> then the conversion module may store command:1 in the database. During re-routing of commands to the destination cloud network, the command_convertor may convert command:1 to command:2, and then route it to the destination cloud for execution.

While requests are executed in the destination IaaS cloud network, the conversion module may de-register the source IaaS cloud network from multi cloud management software. This may be done by invoking the APIs provided by multi cloud management software. Because the conversion module may be part of the multi cloud management software, it may directly invoke the code that de-registers the source cloud network in the multi cloud management software.

At this stage, the destination cloud network will have one controller and all the compute nodes that were earlier present in the source IaaS cloud network, and source cloud network will have the remaining controllers that were not yet moved to the destination cloud network. The conversion module may install the destination IaaS cloud network OS on the remaining controllers and register them as controllers in the destination IaaS cloud network. Nodes may be registered as controllers in the target cloud by adding the details of nodes present in a configuration file (e.g., a controller node configuration file) and by invoking scripts through the conversion module. The scripts may register the nodes as controllers in the IaaS cloud network and bring up all the cloud services on those controllers. At the end of this step, the destination IaaS cloud network may be up and running with the target cloud network by using all the resources and services that were present in the source IaaS cloud network, the source IaaS cloud network may have been removed from the multi cloud management software. Thereafter, the conversion module may send a conversion successful message to the end user.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory computer readable medium having executable instructions stored thereon, that, when executed by a processor, performs operations of:
  receiving a user request to convert a source cloud network to a destination cloud network;
  in response to receiving the request, invoking a driver based on the destination cloud network specified in the user request;
  using at least the invoked driver to retrieve cloud configuration data of the source cloud network and an operating system (OS) image of the destination cloud network, the retrieved cloud configuration data comprising configuration data of a controller of the source cloud network and a compute node of the source cloud network;
  using at least the retrieved cloud configuration data of the source cloud network and the retrieved OS image of the destination cloud network, converting the source cloud network to the destination cloud network, wherein converting comprises:
    using at least the retrieved OS image of the destination cloud network to install the OS of the destination cloud network on a machine that is not the controller of the source cloud network;
    after installing the OS of the destination cloud network on the machine, configuring services of the destination cloud network on the machine;
    after configuring services of the destination cloud network on the machine:
      installing the OS of the destination cloud network on the controller; and
      registering the controller as a new controller in the destination cloud network; and
  sending a notification to the user that the conversion was completed.

2. The non-transitory computer readable medium of claim 1, wherein the converting comprises:
   determining if there are multiple controllers in the source cloud network;
   selecting a controller from the plurality of controllers in the source cloud network;
   using the retrieved OS image of the destination cloud network to install the OS of the destination cloud network on the selected controller; and
   after installing the OS of the destination cloud network on the selected controller, configuring services of the destination cloud on the controller.

3. The non-transitory computer readable medium of claim 2, wherein converting the source cloud network to the destination cloud network comprises:
   pausing and storing all new request being sent to the source cloud network;
   moving the compute node of the source cloud network to the destination cloud network; and
   after moving the compute node of the source cloud network to the destination cloud network, redirecting the stored requests to the destination cloud network.

4. The non-transitory computer readable medium of claim 3, wherein converting the source cloud network to the destination cloud network comprises: after redirecting the stored requests to the destination cloud network, de-registering the source cloud network.

5. The non-transitory computer readable medium of claim 4, wherein converting the source cloud network to the destination cloud network comprises: after redirecting the stored requests to the destination cloud network: using the retrieved OS image of the destination cloud network to install the OS of the destination cloud network on another controller of the source cloud network; and registering the other controller with the destination cloud network.

6. The non-transitory computer readable medium of claim 2, wherein the retrieved cloud configuration data comprises: an IP address of the controller, an IP address of the compute node, and data regarding required cloud services of the source cloud network.

7. The non-transitory computer readable medium of claim 3, wherein redirecting the stored requests to the destination cloud network comprises converting the requests to a request format that is executable by the destination cloud network.

8. The non-transitory computer readable medium of claim 1, wherein converting the source cloud network to the destination cloud network comprises: after registering the controller, deregistering the machine from the destination cloud network.

9. The non-transitory computer readable medium of claim 1, wherein the converting comprises:
   determining if the controller is the only controller of the source cloud network; and
   in response to a determination that the controller is the only controller of the source cloud network, using at least the retrieved OS image of the destination cloud network to install the OS of the destination cloud network on a machine that is not the controller of the source cloud network.

10. The non-transitory computer readable medium of claim 1, wherein converting the source cloud network to the destination cloud network comprises: after configuring services of the destination cloud on the machine:
   pausing and storing all new requests being sent to the source cloud network; and
   after pausing and storing all new requests, moving the compute node of the source cloud network to the destination cloud network.

11. The non-transitory computer readable medium of claim 10, wherein converting the source cloud network to the destination cloud network comprises: after registering the controller as a new controller on the destination cloud network: redirecting all of the stored requests to the destination cloud network.

12. The non-transitory computer readable medium of claim 1, wherein the user request to convert the source cloud network to a destination cloud network is a user request to merge a source cloud network with an existing destination cloud network, the existing destination cloud network comprising a controller configured with services of the destination cloud network, wherein converting the source cloud network to the destination cloud network comprises: registering the controller and compute node of the source cloud network with the existing destination cloud network.

13. The non-transitory computer readable medium of claim 12, wherein converting the source cloud network to the destination cloud network comprises:
   pausing and storing all new request being sent to the source cloud network;
   moving all compute nodes of the source cloud network to the destination cloud network; and
   after moving all compute nodes of the source cloud network to the destination cloud network, redirecting the stored requests to the destination cloud network.

14. The non-transitory computer readable medium of claim 13, wherein converting the source cloud network to the destination cloud network comprises: after moving all compute nodes to the destination cloud network, de-registering the source cloud network.

15. A method, comprising:
   receiving a user request to convert a first infrastructure as a service (IaaS) cloud network to a second IaaS cloud network;
   in response to receiving the request, invoking a driver based on the second IaaS cloud network specified in the user request;
   using at least the invoked driver to retrieve cloud configuration data of the source cloud network and an operating system (OS) image of the second IaaS cloud network, the retrieved cloud configuration data comprising configuration data of a controller of the first IaaS cloud network and a compute node of the first IaaS cloud network;
   using at least the retrieved cloud configuration data of the first IaaS cloud network and the retrieved OS image of the second IaaS cloud network, converting the first IaaS cloud network to the second IaaS cloud network, wherein converting comprises:
   using at least the retrieved OS image of the second IaaS cloud network to install the OS of the second IaaS cloud network on a machine that is not the controller of the first IaaS cloud network;
   after installing the OS of the second IaaS cloud network on the machine, configuring services of the second IaaS cloud network on the machine; and
   after configuring services of the second IaaS cloud network on the machine:
      installing the second IaaS cloud network OS on the controller; and
      registering the controller as a new controller in the second IaaS cloud network; and sending a notification to the user that the conversion was completed.

16. The method of claim 15, wherein converting the first IaaS cloud network to the second IaaS cloud network comprises:
determining if there are multiple controllers in the source cloud network;
selecting a controller from the plurality of controllers of the first IaaS cloud network;
using the retrieved OS image of the second IaaS cloud network to install the OS of the second IaaS cloud network on the selected controller; and
after installing the OS of the second IaaS cloud network on the controller, configuring services of the second IaaS cloud network on the selected controller.

17. The method of claim 16, wherein converting the first IaaS cloud network to the second IaaS cloud network comprises:
pausing and storing all new request being sent to the first IaaS cloud network;
moving the compute node of the first IaaS cloud network to the second IaaS cloud network; and
after moving the compute node of the first IaaS cloud network to the second IaaS cloud network, redirecting the stored requests to the second IaaS cloud network.

18. The method of claim 15, wherein the user request to convert the first IaaS cloud network to a second IaaS cloud network is a user request to merge a first IaaS cloud network with an existing second IaaS cloud network, the existing second IaaS cloud network comprising a controller configured with services of the second IaaS cloud network, wherein converting the first IaaS cloud network to the second IaaS cloud network comprises: registering the controller and compute node of the first IaaS cloud network with the existing second IaaS cloud network.

19. A system, comprising:
a processor; and
a non-transitory computer readable medium having executable instructions stored thereon, that, when executed by the processor; performs operations of:
invoking a driver based on a destination cloud network specified in a request to convert a source cloud network to a destination cloud network;
using at least the invoked driver to retrieve cloud configuration data of the source cloud network and an operating system (OS) image of the destination cloud network, the retrieved cloud configuration data comprising configuration data of a controller of the source cloud network and a compute node of the source cloud network;
using at least the retrieved cloud configuration data of the source cloud network and the retrieved OS image of the destination cloud network, converting the source cloud network to the destination cloud network, wherein converting comprises:
using at least the retrieved OS image of the destination cloud network to install the OS of the destination cloud network on a machine that is not a controller of the source cloud network;
after installing the OS of the destination cloud network on the machine, configuring services of the destination cloud network on the machine;
after configuring services of the destination cloud network on the machine:
installing the OS of the destination cloud network on the controller; and
registering the controller as a new controller in the destination cloud network; and
sending a notification that the conversion was completed.

20. The system of claim 19, wherein converting the source cloud network to the destination cloud network comprises: after registering the controller, deregistering the machine from the destination cloud network.

* * * * *